United States Patent [19]

Kato

[11] Patent Number: 4,851,947
[45] Date of Patent: Jul. 25, 1989

[54] IMPROVED DISK CARTRIDGE INCLUDING A SHUTTER FOR OPENING AND CLOSING HEAD ENTRY APERTURES

[75] Inventor: Yoshitake Kato, Ibaraki, Japan
[73] Assignee: Hitachi Maxell, Ltd., Osaka, Japan
[21] Appl. No.: 107,506
[22] Filed: Oct. 13, 1987

[30] Foreign Application Priority Data

Oct. 13, 1986 [JP] Japan ................................. 61-242821

[51] Int. Cl.$^4$ ......................................... G11B 23/033
[52] U.S. Cl. .................................................. 360/133
[58] Field of Search ........................................ 360/133

[56] References Cited

FOREIGN PATENT DOCUMENTS 0137965 4/1985 European Pat. Off. ............ 360/133
57-38388 1/1982 Japan .

Primary Examiner—Robert S. Tupper
Attorney, Agent, or Firm—Antonelli, Terry & Wands

[57] ABSTRACT

A disk cartridge having a cartridge casing containing a double-sided disk recording medium, a pair of head entry apertures formed in both surfaces of the cartridge casing, and a shutter member having a U-shaped profile and slidably attached to the cartridge casing while pinching the same, the shutter member being at least capable of opening and closing the head entry apertures. At least one of the surfaces of the shutter member is provided with: a cover portion having a width slightly larger than the width of the head entry apertures in the direction of sliding movement of the shutter member; a front plate portion projecting from the cover portion on the opposite sides thereof in the sliding direction, and moving along the front end surface of the cartridge casing; and abutting surfaces formed at the opposite ends of the front plate portion and adapted to be brought into contact with a shutter opening member.

5 Claims, 14 Drawing Sheets

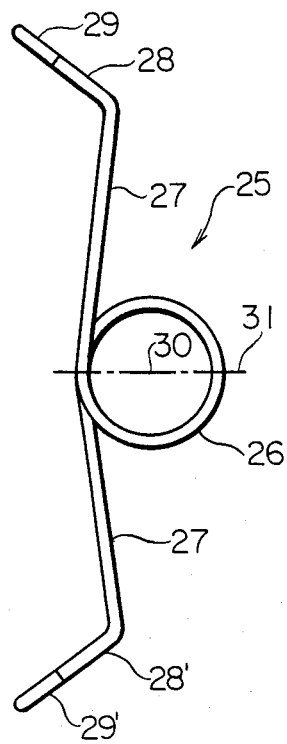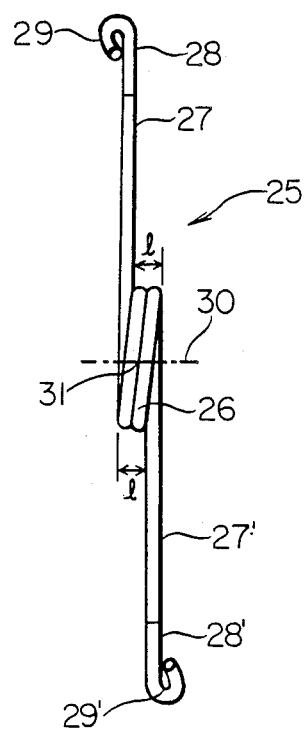

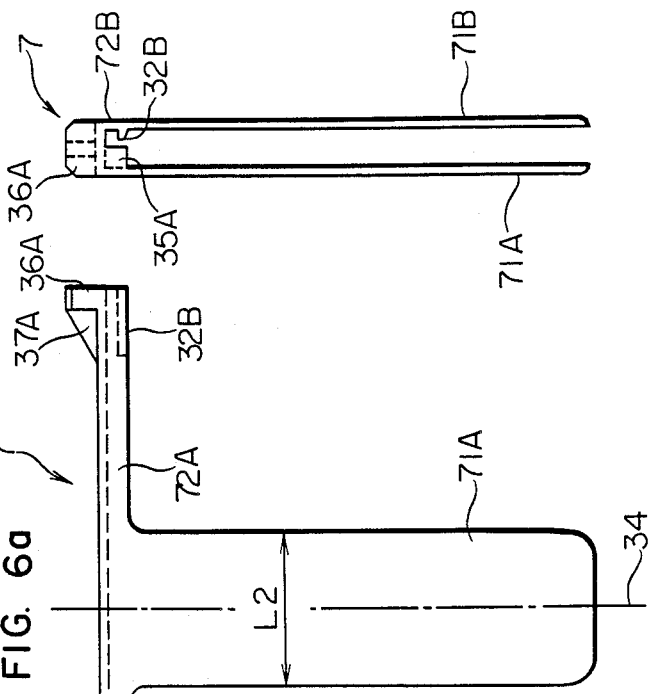
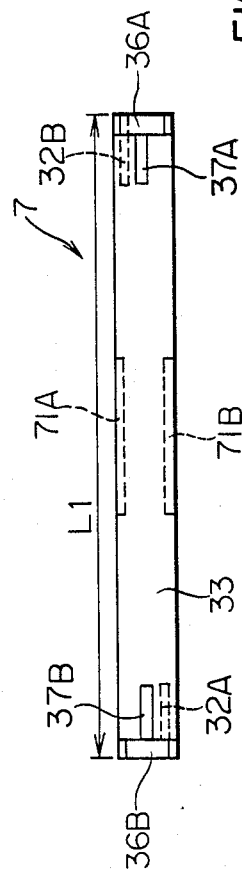
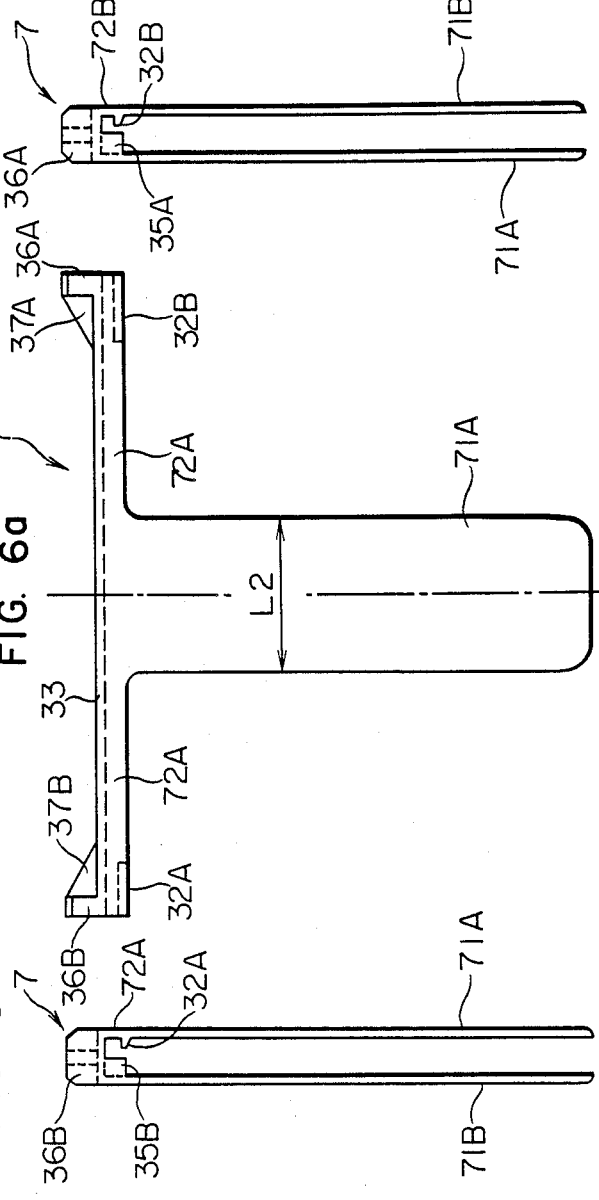

IMPROVED DISK CARTRIDGE INCLUDING A SHUTTER FOR OPENING AND CLOSING HEAD ENTRY APERTURES

BACKGROUND OF THE INVENTION

The present invention relates to a disk cartridge in which a double-sided disk is housed and, more particularly, to a shutter member for opening and closing head entry apertures formed in at least both surfaces of the disk cartridge.

To make it easy to handle and protect it from dust, a recording medium in the form of a disk, such as a magnetic disk or optical disk, which can record and reproduce desired information is still held in a disk cartridge even when it is loaded into a recording and reproduction apparatus. Therefore, a cartridge case which forms the main body of the disk cartridge is provided with a head entry aperture which enables a head to access the disk recording medium when the cartridge is loaded into the recording and reproduction apparatus. However, the provision of a head entry aperture in this manner presents some disadvantages. For example, when the disk cartridge is not being used, dust can enter the cartridge case through this head entry aperture and adhere to the recording surface of the disk recording medium. When the disk cartridge is being handled, fingers, etc., can touch the recording surface of the disk cartridge through the head entry aperture, and dirty or scratch this surface. Therefore, the provision of such a head entry aperture could damage the recording or reproducing performance. For this reason, a disk cartridge is usually provided with a shutter which closes the head entry aperture when the disk is not being used.

FIGS. 12a and 12b are plan views of an example of a conventional disk cartridge of this type (such as that disclosed in Japanese Utility Model Unexamined Publication No. 38388/19-82), in which FIG. 12a shows the front side and FIG. 12b shows the reverse side. As shown in FIGS. 12a and 12b, a cartridge casing 1 has, an upper casing 2, a lower casing 3, a recording medium 4 in the form of a disk, spindle holes 5A and 5B, head entry apertures 6A and 6B, a shutter 7, shutter surfaces 7A and 7B, and openings 8A and 8B.

As shown in FIGS. 12a and 12b, the cartridge casing 1 is integrally formed of the upper casing 2 and the lower casing 3, and incorporates the disk recording medium 4, of which both surfaces can be used. The spindle holes 5 have the same diameter and are coaxially formed in the upper and lower casings 2 and 3. The head entry apertures 6A and 6B have the same shape and are formed at positions between the front end of the casing and the spindle holes 5 of the upper and lower casing 2 and 3 (top of the figures) in such a manner that they cross the entire recording area of the disk recording medium 4 in the radial direction thereof and coincide with each other in the direction perpendicular to the recording surfaces.

The shutter 7 has a U-shaped profile and is attached to the cartridge casing 1 in such a manner that the cartridge casing is sandwiched between the two sides of the shutter. The opening 8A is formed in the shutter surface 7A of the shutter 7 on the side of the upper casing 2 in a position which is shifted from the center of the shutter surface 7A to the right as viewed in FIG. 12a. The opening 8B is formed in the shutter surface 7B of the shutter 7 on the side of the lower casing 3 in a position which is shifted from the center of the shutter surface 7B to the left as viewed in FIG. 12b. The positions of the openings 8A and 8B coincide with each other in the direction perpendicular to the recording surfaces. The shape of the openings 8A and 8B is generally the same as that of the head entry apertures 6A and 6B, but their size is slightly greater than that of the apertures 6A and 6B.

The shutter 7 can slide relative to the cartridge casing 1 in the directions indicated by the arrows A and B.

When the disk cartridge is not being used, the shutter 7 is positioned at one end of its slidable range, as shown in the figures, so that the head entry apertures 6A and 6B are closed. However, when the disk cartridge is being used, the shutter 7 is moved in the direction indicated by the arrow A until it is positioned at the other end of the slidable range. The opening 8A of the shutter 7 is thereby set in a position at which it surrounds the head entry aperture 6A of the upper casing 2, and the opening 8B is set in a position at which it surrounds the head entry aperture 6B of the lower casing 3, thereby exposing the head entry apertures 6A and 6B. The disk cartridge 1 is thereafter moved, so that the head can be brought into contact with one of the two recording surfaces of the disk recording medium 4 through the corresponding head entry aperture 6A or 6B and, at the same time, a pad can be brought into contact with the other recording surface through the other head entry aperture. A spindle is inserted through the spindle hole 5A or 5B, and a center hub of the disk recording medium 4 is engaged with the spindle. When the disk cartridge 1 is removed from the recording and reproduction apparatus, the head entry apertures 6A and 6B can be closed by the movement of the shutter 7 in the direction indicated by the arrow B.

In the disk cartridge thus constructed, the shutter 7 is adapted to be moved relative to the cartridge casing 1 only in the direction indicated by the arrow A in order to open the head entry apertures 6A and 6B. Therefore, if the disk cartridge is used with the upper casing 2 shown in FIG. 12a facing upward to record or reproduce information by using one of the recording surfaces of the disk recording medium 4, the shutter 7 must be moved in the direction indicated by the arrow A in order to open the head entry aperture 6A, because the shutter had been resting at the right end of the slidable range. Conversely, if the recording or reproduction of information is performed by using the other recording surface of the disk recording medium 4, the disk cartridge is inverted relative to the state shown in FIG. 12a in which the lower casing 3 faces upward, with the shutter 7 resting at the left end of the slidable range, as shown in FIG. 12b. The shutter 7 must be moved in the direction indicated by the arrow A in FIG. 12b in order to open the head entry aperture 6B, but, in this case, the direction indicated by the arrow A in FIG. 12b is opposite to the direction indicated by the arrow A in FIG. 12a with respect to the recording and reproduction apparatus.

As can be understood from the foregoing, this type of cartridge necessitates two sets of shutter moving mechanisms, resulting in a complicated structure of the recording and reproduction apparatus, since the direction of movement of the shutter 7 in the recording and reproduction apparatus must be changed depending upon which recording surface of the disk recording medium 4 is used to record or reproduce information.

To cope with this problem, the applicants proposed, in Japanese Patent Laid-Open No. 43279/1985, a disk cartridge in which it is sufficient to move the shutter in only one direction in order to open the head entry apertures in a recording and reproduction apparatus, irrespective of which side of the recording surfaces of the disk recording medium is to be used to record or reproduce information.

FIGS. 13a and 13b are plan views of this disk cartridge, in which FIG. 13a shows the front side and FIG. 13b shows the reverse side. Parts corresponding to those shown in FIGS. 12a and 12b are given the same reference symbols.

The shutter 7 of this disk cartridge has a U-shaped profile and is attached so as to sandwich the cartridge casing 1. However, there is no opening in either of the shutter surface 7A or the shutter surface 7B, and these shutter surfaces are rectangular and large enough to sufficiently cover the head entry apertures 6A and 6B the spindle holes 5A and 5b. This shutter 7 can slide along a guide grooves 9A and 9B which are formed in the upper and lower casings 2 and 3, respectively, of the cartridge casing 1. When the disk cartridge is not being used, the shutter 7 is in a position corresponding to the center of the cartridge casing 1 in the widthwise direction, and is urged by spring members 10A and 10B so that the spindle holes 5A and 5B and the head entry aperture 10A and 10B are all closed thereby.

When one of the two recording surfaces of the disk recording medium 4 is to be used to record or reproduce information by setting the disk cartridge so that the upper casing 2 in FIG. 13a faces upward, the shutter 7 is moved against the urging force of the spring member 10B by a shutter moving mechanism (not shown) in the direction indicated by the arrow A as far as the end of the slidable range. The spindle hole 5A and the head opening aperture 6A are thereby exposed. At the same time, on the reverse side of the disk cartridge shown in FIG. 13b (i.e., on the side of the lower casing 3), the shutter 7 moves relative to the lower casing 3 in the direction indicated by the arrow B, so that the spindle hole 5B and the head entry aperture 6B are also exposed.

When the other recording surface of the disk recording medium 4 is used to record or reproduce information, the disk cartridge is set so that the lower case 3 faces upward, as shown in FIG. 13b. In this case, the spindle hole 5B and the head entry aperture 6B are exposed by moving the shutter 7 against the urging force of the spring 10A (FIG. 13a) in the direction indicated by the arrow A (in the same direction as that indicated by the arrow a in FIG. 13a relative to the recording and reproduction apparatus). At the same time, on the front surface side of the disk cartridge (i.e., the side of the upper casing 2), the shutter 7 moves relative to the upper casing 2 in the direction indicated by the arrow B, so that the spindle hole 5A and the head entry aperture 6A are also exposed.

In this disk cartridge, it is sufficient to move the shutter 7 in the same direction irrespective of which recording surface of the disk recording medium 4 is used to record or produce information. Therefore, the shutter moving mechanism can be simplified, resulting in a simpler construction of the recording and reproduction apparatus. In addition, dust-proofing effect can be provided for the spindle holes 5A and 5B.

When the above-described disk cartridge proposed by the applicants is used, it is necessary to move the shutter located at the center of the slidable range up to the end thereof in order to open the spindle holes and head entry apertures. Therefore, the shutter moving mechanism is disposed on a straight line which connects the spindle hole 5A or 5B to the head entry aperture 6A or 6B. It should be noted here that a carriage mechanism for moving the head and pad, etc., is also installed on this straight line. It is therefore very difficult to determine the disposition of the shutter moving mechanism. Moreover, the construction of this mechanism tends to be complicated and bulky.

SUMMARY OF THE INVENTION

It is an object of the present invention to provide a disk cartridge which is free from the above-described problems, and which relaxes the conditions governing the disposition of the shutter moving mechanism and enables the shutter to move smoothly.

To this end, the present invention provides a disk cartridge in which at least one of the surfaces of the shutter member is provided with: a cover portion having a width slightly larger than the width of the head entry apertures in the direction of sliding movement of the shutter member; a front plate portion projecting from the cover portion on the opposite sides thereof in the sliding direction, and moving along the front end surface of the cartridge casing; and abutting surfaces formed at the opposite ends of the front plate portion and adapted to be in contact with a shutter opening member.

BRIEF DESCRIPTION OF THE DRAWINGS

FIGS. 1 to 8 illustrate a disk cartridge which represents an embodiment of the present invention;

FIGS. 4a and 4b are a plan view and a side view of a spring member;

FIGS. 6a, 6b, 6c and 6d are a plan view, a front view, a left-hand side view and a right-hand side view of a shutter member;

FIG. 7 is a plan view in which the state of attachment of the shutter member shown in FIGS. 6 are illustrated;

FIG. 8 is a plan view of a spring member accommodating portion at the time when the head entry aperture is open;

DESCRIPTION OF THE PREFERRED EMBODIMENTS

Figure 1A:
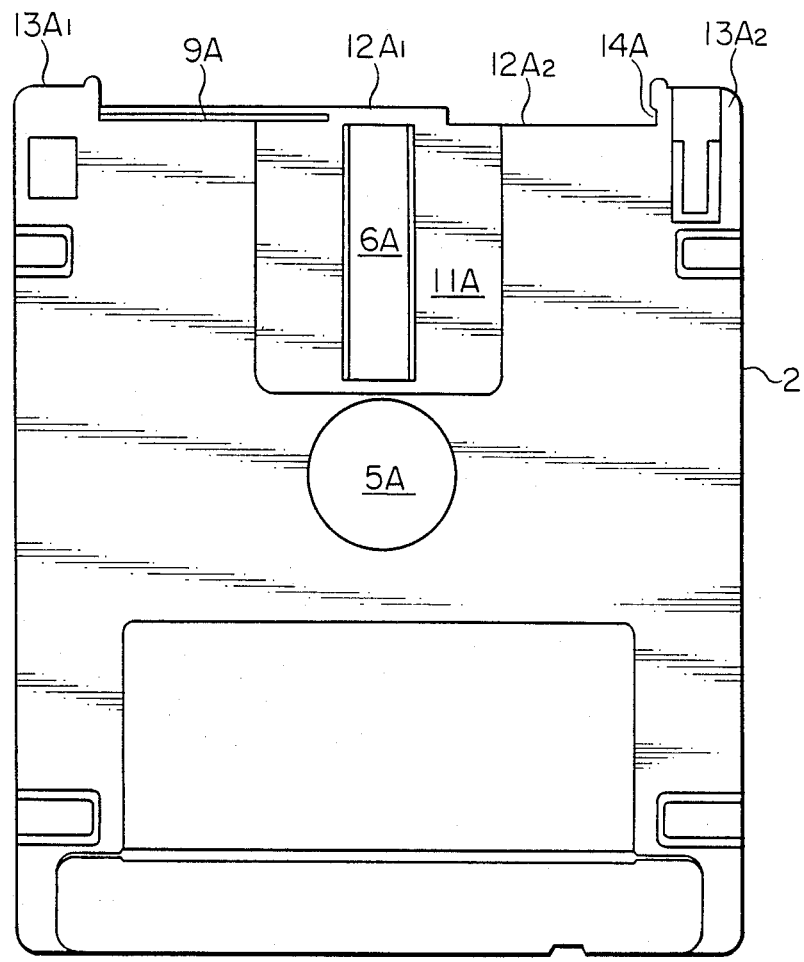
FIGS. 1a and 1b are plan views of an upper casing.
Figure 1B:
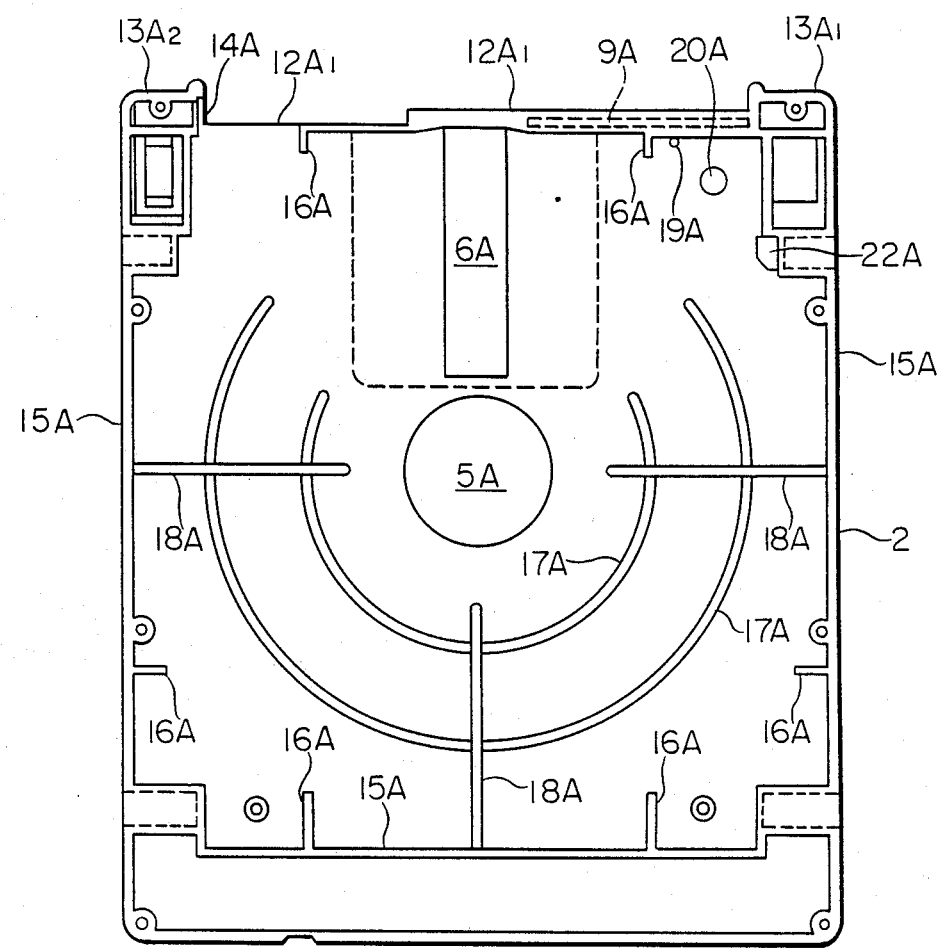
Figure 2A:
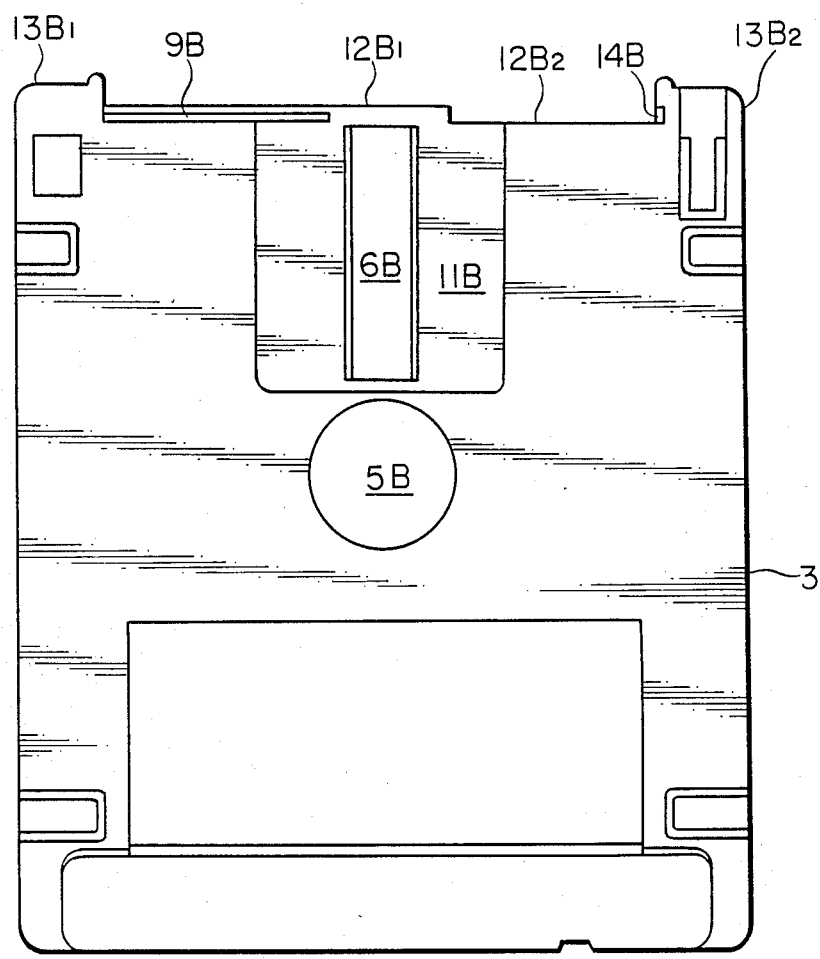
FIGS. 2a and 2b are plan views of a lower casing.
Figure 2B:
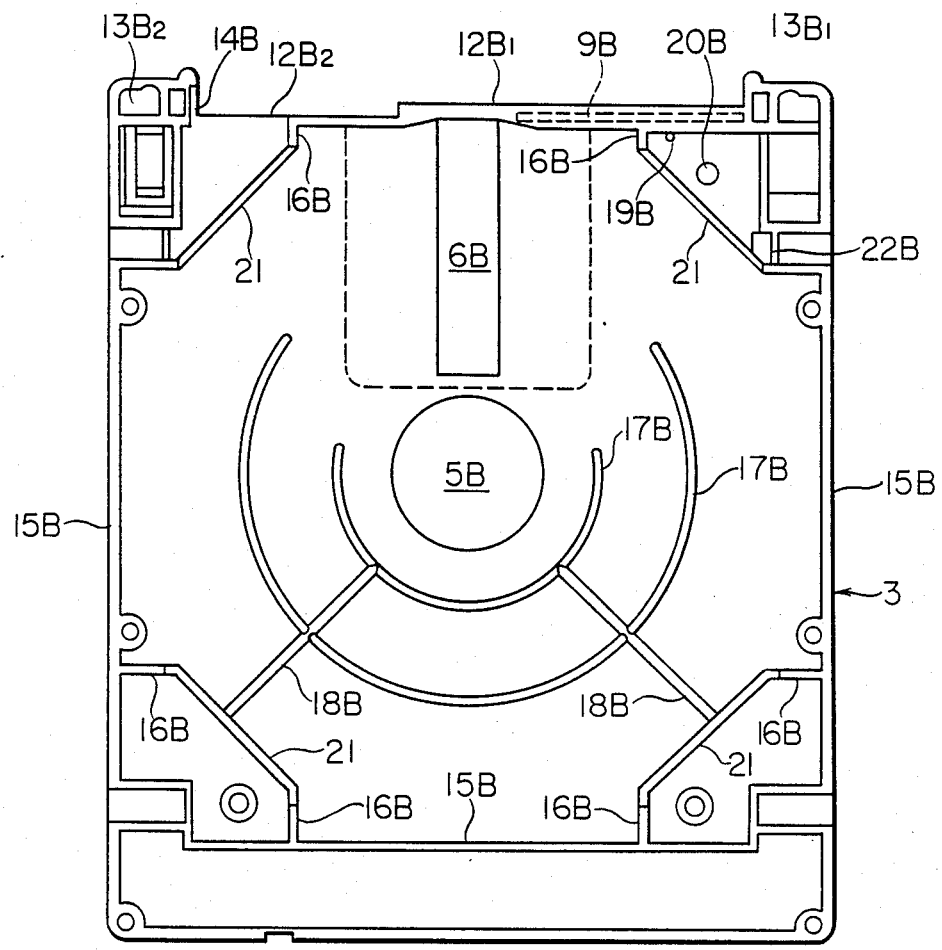

FIGS. 1 and 2 illustrate a cartridge case in accordance with the present invention. FIG. 1a is a plan view of a upper casing of the cartridge casing seen from outside of the casing, and FIG. 1b is a plan view of this upper casing seen from the inside (a view of the side of the upper casing facing the disk recording medium). FIG. 2a is a plan view of the lower casing of the cartridge casing seen from the outside, and FIG. 2b is a plan view of this lower casing seen from the inside. Referring to FIG. 1a to FIG. 2b, the cartridge casing has the upper and the lower casings 2 and 3, spindle holes 5A and 5B, head entry apertures 6A and 6B, guide grooves 9A and 9B, shutter slide portions 11A and 11B, side edges 12A$_1$, 12A$_2$, 12B$_1$ and 12B$_2$, forward left corners 13A$_1$ and 13B$_1$, forward right corners 13A$_2$ and 13B$_2$, recesses 14A and 14B, side walls 15A and 15B, walls 16A and 16B, arcuate ribs 17A and 17B, radial ribs 18A and 18B, stoppers 19A and 19B, bosses 20A and 20B, partition walls 21, and locking holes 22A and 22B.

As shown in FIGS. 1a and 1b, the upper casing 2 is provided with the spindle hole 5A formed generally at the center of the casing, and the head entry aperture 6A formed at a position between the front end of the casing and the spindle hole 5A (on the upper side in the figures).

As shown in FIGS. 1a, the external surface of this upper casing 2 is slightly depressed at a portion between the front end of the casing and the spindle hole 5A to form the flat shutter slide portion 11A. The forward side edge of the upper casing 2 consists of the two side edges 12A$_1$ and 12A$_2$ having a boundary formed at a position slightly shifted to the right relative to the head entry aperture 6A, and the side edge 12A$_1$ protrudes forward slightly beyond the side edge 12A$_2$. The guide groove 9A is formed in the vicinity of the side edge 12A$_1$ on the left side of the head entry aperture 6A so as to be parallel to this slide edge 12A$_1$.

The forward left corner portion 13A$_1$ and forward right corner portion 13A$_2$ of the upper casing 2 protrude forward beyond the side edge 12A$_1$, and the forward right corner portion 13A$_2$ has the recess 14A that faces the stepped portion formed between the side edges 12A$_1$ and 12A$_2$.

As shown in FIG. 1b, the internal surface of the upper casing 2 is provided with the side wall 15A formed along the sides of the upper casing 2 except for a part of the side edge 12A$_1$. A plurality of walls 16A of the same height as that of the side wall 15A are formed inside the side wall 15A so as to inwardly project therefrom. The pin-like stopper 19A is provided on the right side of the wall 16 in the vicinity of the side edge 12A$_1$. The stopper 19A is set lighter than the side wall 15A. The upper casing 2 also has a plurality of arcuate ribs 17A which are formed inside the side wall 15A such that they are concentrical with the spindle hole 5A, and a plurality of radial ribs 18a which inwardly project from the side wall 15A radially with respect to the spindle hole 5. The heights of the arcuate ribs 17A and the radial ribs 18A are lower than that of the side wall 15. In addition, the boss 20A is provided in the forward right corner portion inside the side wall 15A on the back side of the shutter slide portion 11A, and the locking hole 22A is formed at a lower right position relative to the boss 20A, as viewed in FIG. 1b.

A disk recording medium (not shown) is placed inside the side wall 15A so that its center corresponds to that of the spindle hole 5A.

As shown in FIGS. 2a and 2b, the internal and external surfaces of the lower casing 3 are substantially the same as those of the upper casing 2. Therefore, the portions of the casing shown in FIGS. 2a and 2b are indicated by the notation in which A in each reference symbol in FIGS. 1a and 1b is replaced with B.

As shown in FIG. 2b, however, the internal surface of the lower casing 3 is provided with the partition walls 21 connected to the ends of the walls 16b projecting from the side wall 15B in such a manner that the partition walls 21 isolate the four corner portions of the lower casing 3. These partition walls 21 are higher than the side wall 15B and the walls 16B.

Spring members, which will be described later, are attached to the bosses 20A and 20B of the upper and lower casings 2 and 3, the disk recording medium is disposed so as to face the internal surface of the lower casing 3, and the upper casing 2 is superposed on the lower casing 3 in such a manner that the internal surface of the upper casing 2 faces that of the lower casing 3 and that the periphery of the upper casing 2 coincides with that of the lower casing 3. The partition walls 21 on the internal surface of the lower casing 3 are thereby made to fit between the ends of the walls 16A and the side walls 15A of the upper casing 2 and between two ends of the walls 16A, and the upper and the lower casings 2 and 3 are integrally connected to each other by ultrasonic heating, thereby obtaining the cartridge casing.

At the same time, the side walls 15A and 15B walls 16A and 16B of the upper and the lower casings 2 and 3 are brought into close contact with each other. Also, the partition walls 21 of the lower casing 3 are brought into close contact with the internal surface of the upper casing 2. The disk recording medium is enclosed in this manner of assembly.

Figure 3A:
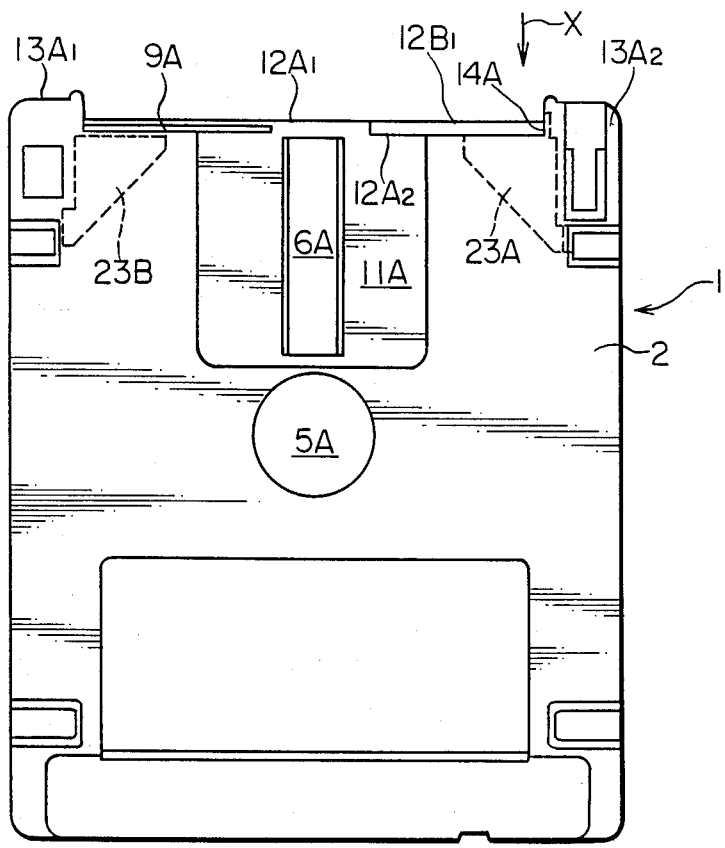
FIGS. 3a and 3b are a plan view and a view of the cartridge casing.

FIG. 3a is an illustration of the cartridge casing 1 thus obtained, in which the casing is seen from the side of the upper casing 2, and in which a portion of the lower casing 3 at the side edge 12B$_1$ is seen in front of the side edge 12A$_2$ of the upper casing 2.

As viewed in the direction indicated by the arrow X in FIG. 3a, there is a clearance 24A (FIG. 3b) at a left-hand position on the side of the upper casing 2 and also there is a clearance 24B at a right-hand position on the side of the lower casing 3. The clearance 24A partially opens a substantially triangular section 23A (FIG. 3a) which is encircled by the side wall 15B, wall 16B and partition wall 21 at the forward right corner of the lower casing 3 (FIG. 2b) and by the side wall 15A and wall 16B at the forward left corner of the upper casing (FIG. 1b). The boss 20B, stopper 19B and locking hole 20b (FIG. 2b) are formed in this section, and a spring member for automatically returning the shutter member, which will be described later, is attached by using these portions. This triangular 23A is hereinafter referred to as a spring accommodating section. Similarly, the clearance 24B opens a substantially triangular spring accommodating section 23B in which the boss 20A, stopper 19A and locking hole 22A (FIG. 1b) are formed, and a spring member is attached by using these portions.

FIG. 4a is a plan view of a spring member 25 to be housed in the spring accommodating sections 23A and 23B, and FIG. 4b is a side view of this spring. The spring member 25 has a coil portion 26, arms 27 and 27', bent portions 28 and 28', and abutting portions 29 and 29'.

Referring to FIGS. 4a and 4b, the spring member 25 is a counterclockwise torsion coil spring, portions of the arms 27, that extend from the opposite ends of the coil portion 26, are bent to form the bent portions 28 and 28', and the ends of the bent portions 28 and 28' are rounded to form the abutting portions 29 and 29'. As is apparent from FIG. 4a, the angle on the side of the coil portion 26 between the arms 27 and 27' extending from the coil portion 26 is set to be slightly smaller than 180°, the bent portion 28 is bent from the arm 27 to the side opposite to the coil portion 26 in a plane which is perpendicular to the center axis 30 of the coil portion 26 and which contains the arm 27, and the angle between the bent portion 28 and the arm 27 is set at an angle greater than 90°. The bent portion 28' is also bent to the side opposite to the coil portion 26 in a plane which is perpendicular to the center axis 30 of the coil 26 and which contains the arm 27', and the angle between the bent portion 28' and the arm 27' is set at the same angle as that between the arm 27 and the bent portion 28. As shown in FIG. 4b, the abutting portion 29 is formed by rounding the end of the bent portion 28 to the side opposite to the coil portion 26 in a plane which is parallel to the center axis 30 of the coil portion 26 and which contains the arm 27 and the bent portion 28. Similarly, the abutting portion 29' is formed by rounding the end of the bent portion 28' to the side opposite to the coil portion 26 in a plane which is parallel to the center axis 30 of the coil portion 26 and which contains the arm 27' and the bent portion 28'. The arms 27 and 27' are equal in length, the bent portions 28 and 28' are also equal in length, and the abutting portions 29 and 29' are equal in length and size. The width l obtained by subtracting the thickness of the arm 27 (or 27') from the distance between the opposite ends of the coil portion 26 shown in FIG. 4b is slightly greater than the height of the side walls 15A and 15B of the upper casing 2 and lower casing 3 shown in FIGS. 1b and 2b.

The spring member 25 formed in this manner is axially symmetrical about an axis 31 which meets the center axis 30 of coil portion 26 at right angles to bisect the angle formed between the arms 27 and 27' and which passes the longitudinal center of the coil portion 26. Therefore, if the spring member 25 in the state shown in FIG. 4a is turned through 180° relative to this axis, the same state as in FIG. 4a is exhibited.

Figure 5A:
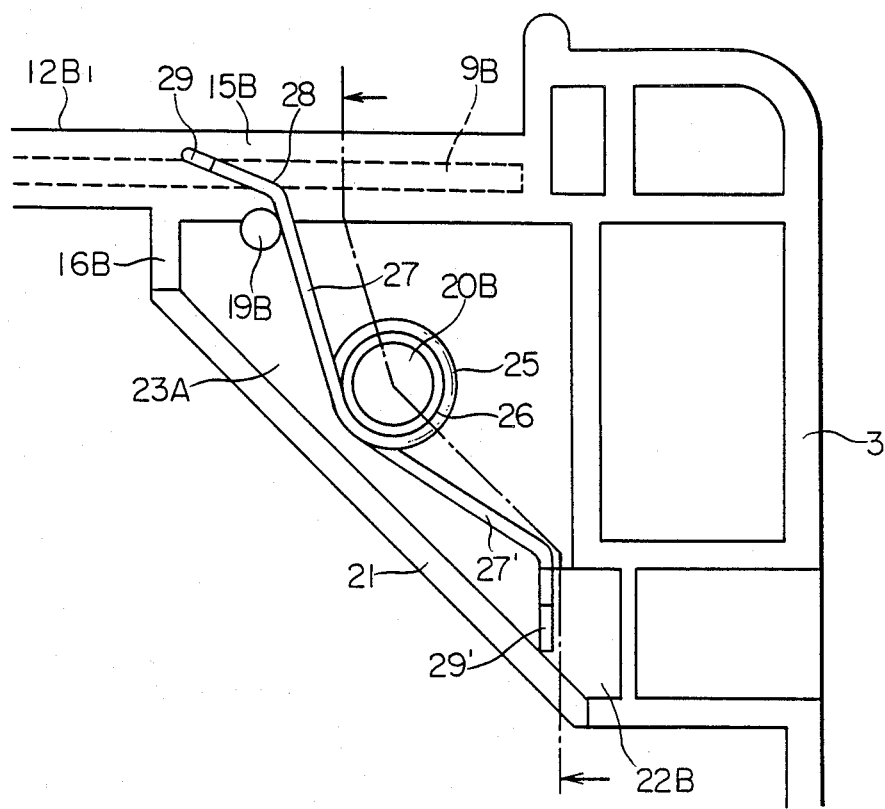
FIGS. 5a and 5b are plan view and a cross-sectional view in which the state of attachment of the spring member shown in FIGS. 4a and 4b is illustrated.
Figure 5B:
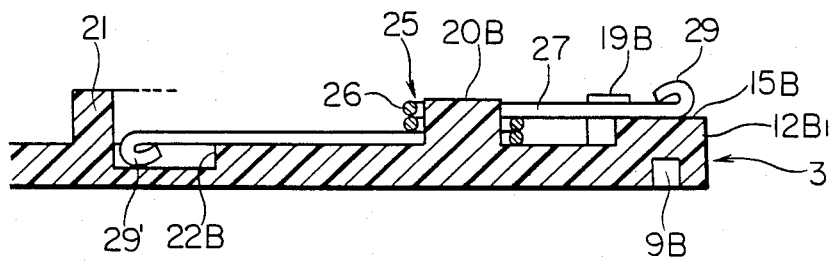

FIGS. 5a and 5b illustrate the state in which the spring member 25 is attached to the lower casing 3 in the spring accommodating section 23A (FIG. 3a) of the lower casing 3. FIG. 5a is a plan view, and FIG. 5b is a sectional view taken along the dot-dash line and seen in the direction indicated by the arrow in FIG. 5a. The same reference symbols as in the above drawings are given to corresponding portions in FIGS. 5a and 5b.

Referring to FIGS. 5a and 5b the coil portion 26 of the spring member 25 is made to fit around the boss 20B. The lower arm 27' of this spring member 25 is directed toward the locking hole 22B, and the abutting portion 29' at the end of the arm 27' is inserted into the locking hole 22B. The upper arm 27 of the spring member 25 is directed toward the side wall 15B and is brought into contact with the stopper 19B. The bent portion 28, including the abutting portion 29, is positioned on the side wall 15B.

In this state, the spring member 25 is twisted, so that the downward rounded abutting portion 29' is pressed against the side of the locking hole 22B by a resilient force which occurs from this torsion, and the arm 27 is also pressed against the stopper 19B.

In the other spring accommodating section 23B (FIG. 3a) also, an equivalent spring member 25 is attached to the upper casing 2 (FIG. 1b) in the same manner. As described earlier with reference to FIG. 4a, the spring member 25 exhibits the same shape and condition even if it is turned through 180°. Therefore, the same spring members 25 can be provided in the spring accommodating section 23A and 23B.

The cartridge casing in accordance with the present invention has been described above. A shutter member in accordance with the present invention will now be described below.

FIGS. 6a to 6d illustrate a shutter member 7: FIG. 6a is a top view, FIG. 6b a front view, FIG. 6c a left-hand sectional view, and FIG. 6d a right-hand sectional view. As shown in these figures, the shutter member has shutter walls 7A and 7B, cover portions 71A and 71B, pawls 32A and 32B, a front plate portion 33, a center line 34, abutting portions 35A and 35B, opening member engaging portions 36A and 36B, reinforcement portions 37A and 37B, and front plate reinforcement portions 72A and 72B.

The shutter member 7 is formed from a synthetic resin, such as polyacetal or polyamide, having improved sliding properties. The cover portions 71A and 71B are formed in such a manner that the width of these cover portions is slightly larger than that of the width of the head entry aperture 6A (or 6B) in the direction of sliding movement of the shutter member. The two cover portions 71A and 71B extend in the same direction, and one-side ends of them are connected by the front plate portion 33 so that they form a U-shaped profile. The front plate portion 33 connects the cover portions 71A and 71B each other and extends from the sides of the cover portions 71A and 71B to the same extent on the opposite side of the direction of the sliding movement, thereby forming a T-shaped configuration in plan.

If, as shown in FIGS. 6a and 6b, the length of the front plate portion 33 in the direction of sliding movement is L1 (FIG. 6b) and the length of the cover portions 71 in the direction of sliding movement is L2 (FIG. 6a), L1 is preferably, 3 to 9 times, or more preferably, 3 to 5 times larger than L2. If L1 is smaller than a value 3 times as large as L2, there is a possibility of the head entry aperture cover portions 71A and 71B not completely clearing the head entry apertures 6 and, hence, the possibility of incomplete opening of the head entry apertures 6. If L1 is larger than a value 9 times as large as L2, there is a possibility of each of the opposite ends of the front plate portion 33 protruding beyond the side of the cartridge casing 1, from the relationship between the dimensions of this member and the cartridge casing 1, when the shutter member 7 moves and opens the head entry apertures 6. For these reasons, it is preferable to design the shutter member by setting L1 within the range of a value 3 to 9 times as large as L2.

The front plate reinforcement portions 72A and 72B are formed at root portions of the cover portions 71A and 71B on the side of the front plate portion 33 in such a manner that they extend over the entire length of the front plate portion 33 and are connected to the cover portions 71A and 71B on the same plane as that on which the cover portions 71A and 71B are formed. Accordingly, a T-shaped configuration in plan, such as that shown in FIG. 6a, is formed by the cover portions 71A and 71B, the front plate portion 33 and the front plate reinforcement portions 72a and 72B.

The front plate reinforcement portions 72A and 72B are positioned such that they face each other. The pawl 32A is formed on the inner surface of the front plate reinforcement portion 72B, as shown in FIG. 6c, and the pawl 32B is formed on the inner surface of the front plate reinforcement portion 72B, as shown in FIG. 6d.

The abutting portion 35B and the opening member engaging portion 36B are provided so as to form a left end surface of the shutter member 7, as shown in FIG. 6c, and the abutting portion 35A and the opening member engaging portions 36A are provided so as to form a right end surface of the shutter member 7, as shown in FIG. 6d. The opening member engaging portions 36A and 36B are reinforced by the reinforcement members 37A and 37B, respectively.

The shutter member 7 thus formed is attached to the cartridge casing 1 while pinching the casing, in such a manner that the internal surface of the cover portion 71A faces the shutter slide portion 11A of the cartridge case 1 while the internal surface of the cover portion 71B faces the shutter slide portion 11B. In this case, the internal surface of the front plate portion 33 of the shutter member 7 contacts the side edge $12A_1$ of the shutter slide portion 11A and the side edge $12B_1$ of the shutter slide portion 11B. The side edges $12A_1$ and $12B_1$ are rounded at the side facing the front plate portion 33, thereby reducing the sliding resistance to the front plate portion 33.

The pawl 32A is fitted into the guide groove 9A formed in the upper casing 2 of the cartridge casing 1 and, similarly, the pawl 32 is fitted into the guide groove 9B formed in the lower casing 3 (FIG. 2a). As shown in FIG. 3a the shutter member 7 is attached to the shutter slide portions 11A and 11B so as to be slidable along the guide grooves 9A and 9B.

Figure 7:
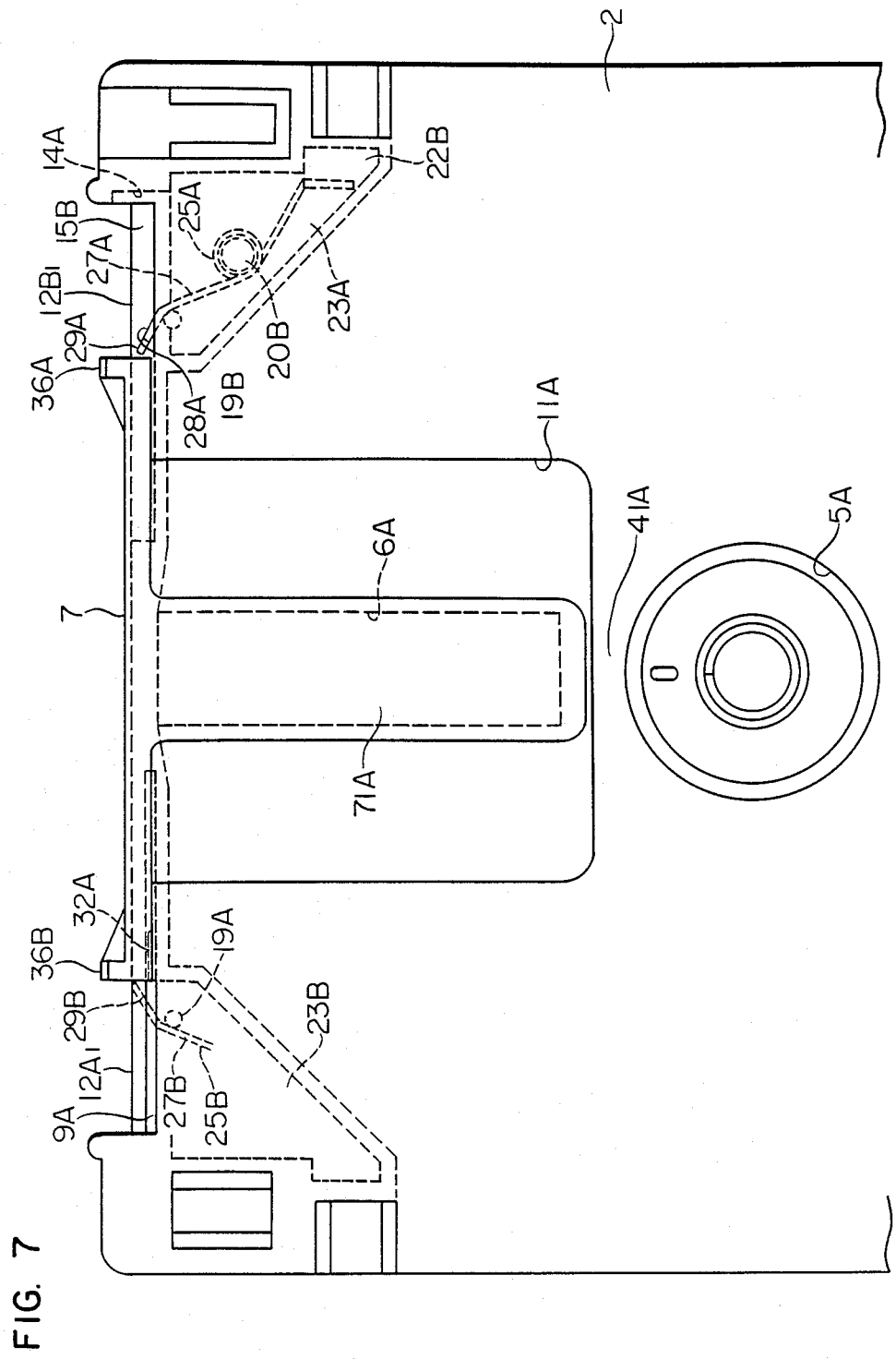

FIG. 7 is an illustration of the state in which the shutter member 7 is attached to the cartridge casing 1 and in which portions corresponding to those shown in the above drawings are indicated by the same reference symbols.

In FIG. 7, the torsion coil springs 25 shown in FIG. 4 to be housed in the spring accommodating sections 23A and 23B are indicated by reference symbols 25A and 25B, respectively. When the shutter member 7 is mounted on the cartridge 1, the abutting portion 29A, that is formed at the end of the arm 27A of the torsion coil spring 25A attached to the boss 20B formed in the spring accommodating section 23A in the lower casing 3 of cartridge casing 1, abuts against the right-hand side of the shutter member 7 by the action of the torsion coil spring 25A being released from the twisted state, and the abutting portion 29B of the torsion coil spring 25B disposed in the spring accommodating section 23B also abuts against the left-hand side of the shutter member 7 by a similar action. When these torsion coil springs 25A and 25B have the same resiliency, the corresponding abutting portions 29A and 29B abut against the right-hand side and left-hand side of the shutter member 7, respectively, and the corresponding arms 27A and 27B are slightly apart from the stoppers 19B and 19A, respectively. At this time, with respect to the shutter member 7, the leftward urging force of the torsion coil spring 25A and the rightward urging force of the torsion coil spring 25B are balanced, so that the shutter member 7 rests at the center of the shutter slide portion 11A. At the same time, the cover portion 71A closes the head entry aperture 6A in the shutter slide portion 11A while the cover portion 71B closes the head entry aperture 6B.

When the disk cartridge of the above-mentioned construction is loaded in a recording and reproduction apparatus, the opening member engaging portion 36B is pressed by a shutter opening member (not shown) if this shutter opening members is provided on the right side in front of the shutter member 7. Therefore, the shutter member 7 slides rightward against the urging force of the torsion coil spring 25A while being guided by the pawls 32A and 32B (FIGS. 6) along the guide grooves 9A and 9B (FIGS. 2). However, when the shutter member 7 moves rightward, it immediately contacts the stopper 19A, and the twisted state is not released any more.

Figure 3B:
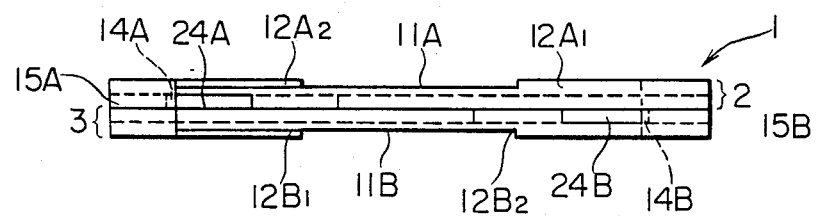
Figure 8:
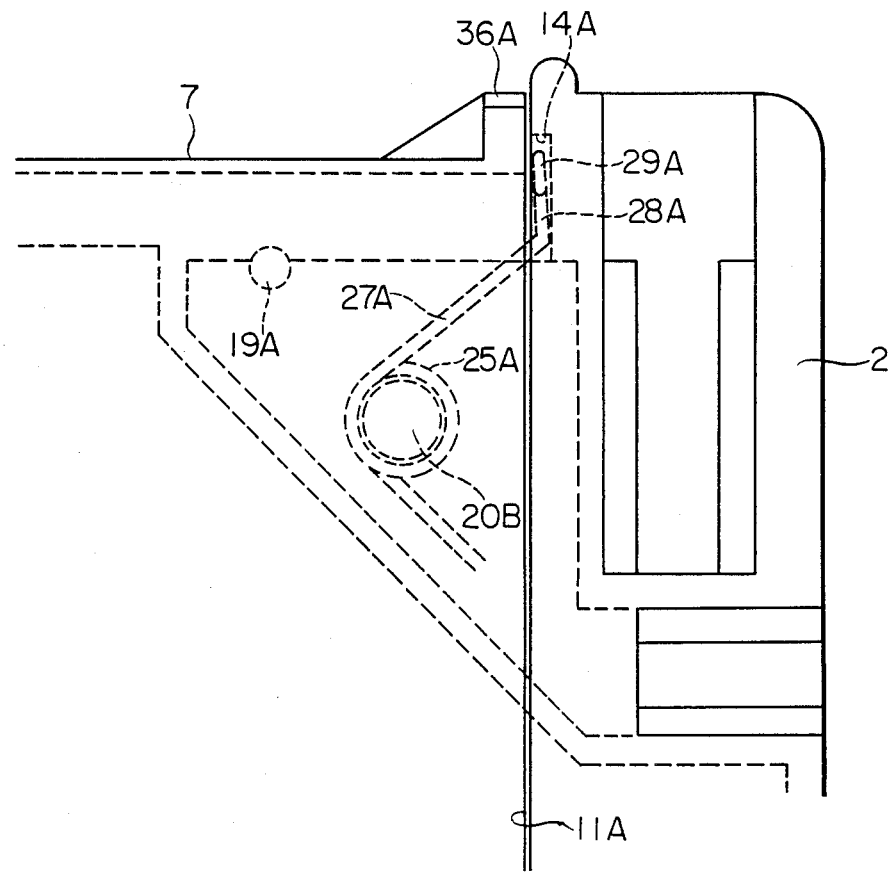

As the shutter member 7 advances rightward, the abutting portion 29A of the torsion coil spring 25A is pressed by the shutter member and moves along an arcuate locus while it is projecting through the clearance 24A (FIG. 3B). When the shutter member 7 reaches the right end of the shutter slide portion 11A and stops there, the bent portion 28A of the torsion coil spring member 25A has entered the recess 14A. At this time, the head entry aperture 6A is opened by the shutter member 7 in the shutter wall 7A. FIG. 8 illustrates the state of the members in the spring accommodating section 23A exhibited at this time. It goes without saying that the head entry aperture 6B in the upper casing (FIG. 2a) is also opened by the shutter member 7 in the shutter wall 7B.

This enables the head to be inserted through the head entry aperture 6A and the pad to be inserted through the head entry aperture 6B, and makes it possible to record or reproduce information by using one of the two recording surfaces of the disk recording medium 4.

When recording and reproduction are performed by using the other recording surface of the disk recording medium 4, the cartridge casing is loaded in the recording and reproduction apparatus after being reversed from the state shown in FIG. 7. This case can be illustrated similarly by replacing A in each reference symbol with B. In this case, the opening member engaging portion 31A of the shutter member 7 is pressed by the same shutter opening member in the same manner, thereby opening the head entry apertures 6A and 6B.

The abutting portion 29A of the torsion coil spring 25A abuts against the abutting portion 35A, the right end surface of the front plate portion 33 and the right-hand side surface of the opening member engaging portion 36A shown in FIG. 6d, even during the movement of the shutter member 7. Similarly, the abutting portion 29B of the torsion coil spring member 25B also abuts against the abutting plates 35B, the left end portion of the front plate portion 33 and the left-hand side surface of the opening member engaging portion 36B shown in FIG. 6c. In this embodiment, as described above, the shutter member is attached to the cartridge casing in such a manner that it normally rests at a position corresponding to the center of the slidable range within the cartridge casing and can move from this rest position in one of the opposite directions. When the shutter member is in the rest position, it can simultaneously close the head entry apertures in the upper and lower casings of the cartridge casing and can simultaneously opens the head entry apertures in the upper and lower casings irrespective of the direction in which the shutter member has moved from the rest position.

As can be understood from the foregoing, when one of the recording surfaces of a double-sided disk recording medium is used for recording or reproduction, it is possible to simultaneously open the head entry apertures in the upper end lower casings of the cartridge by simply moving the shutter member in one direction relative to the recording and reproduction apparatus irrespective of whether the upper casing of the cartridge casing faces upward or downward. Accordingly, it is sufficient for the recording and reproduction apparatus to have only one shutter moving member which moves the shutter member in one direction to open the head entry apertures. Since the shutter member is moved by pressing the opening member engaging portion formed at the end of the shutter member and since the width of the shutter member in the moving direction is sufficiently large due to the existence of the two openings in each shutter wall, the shutter opening member can be disposed in a position at which it does not obstruct other components including the carriage, thereby relaxing design conditions of the recording and reproduction apparatus.

The pawls 32A and 32B (FIG. 6a), that are provided on each shutter wall of the shutter member, are fitted in the guide grooves 9A and 9B (FIGS. 1 and 2) formed in the upper and lower casings of cartridge casing, and the shutter member moves along the guide grooves 9A and 9B. However, the shutter scarcely rattles since the shutter width in the moving direction is sufficiently large and since the pawls 32A and 32B provided at both ends of the shutter member in the moving direction are sufficiently spaced apart from each other.

Figure 9:
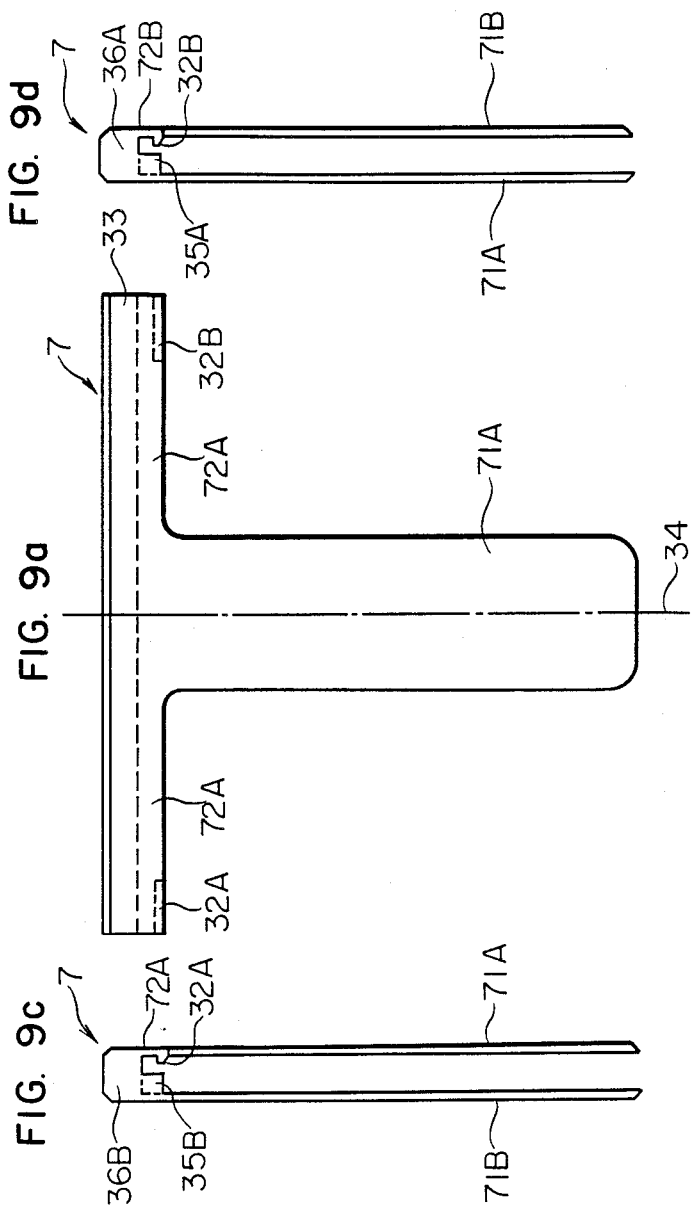
FIGS. 9a, 9b, 9c and 9d are a plan view, a front view, a left-hand side view and a right-hand side view of a modified example of the shutter member.

FIG. 9 is an illustration of a modified example of the shutter member 7. The difference between this example and the shutter member shown in FIG. 6 resides in that, in this example, the thickness of the front plate portion 33 is increased uniformly so as increase the mechanical strength thereof.

Figure 10:
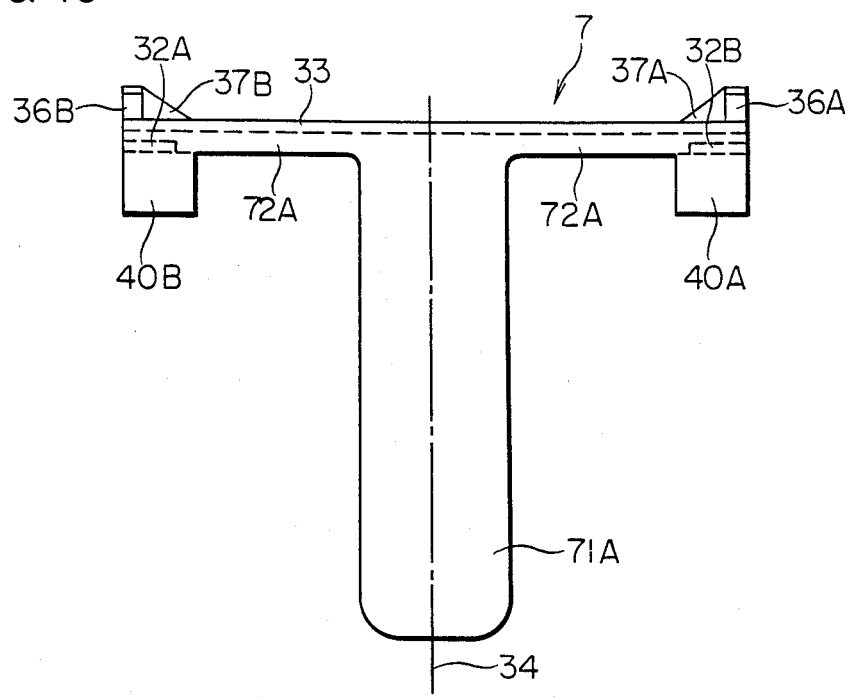
FIG. 10 is a plan view of another modified example of the shutter member.

FIG. 10 is an illustration of another modified example of the shutter member 7. This example differs from that shown in FIG. 6 in that reinforcement portions 40A and 40B are formed in positions opposite to the opening member engaging portions 36A and 36B formed at the opposite ends of the front plate portion 33.

Figure 11:
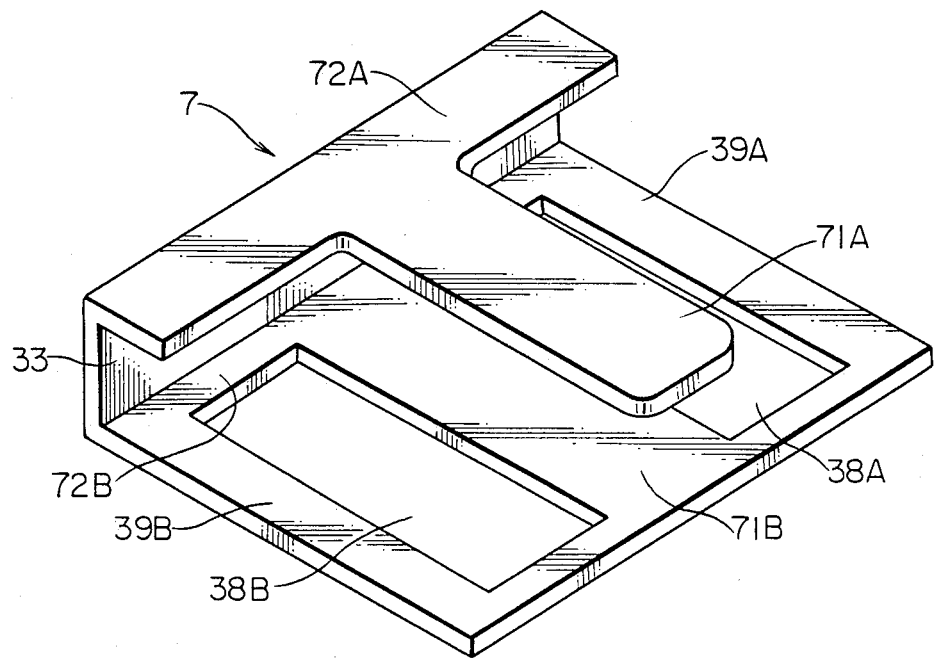
FIG. 11 is a perspective view of still another modified example of the shutter member.
Figure 12A:
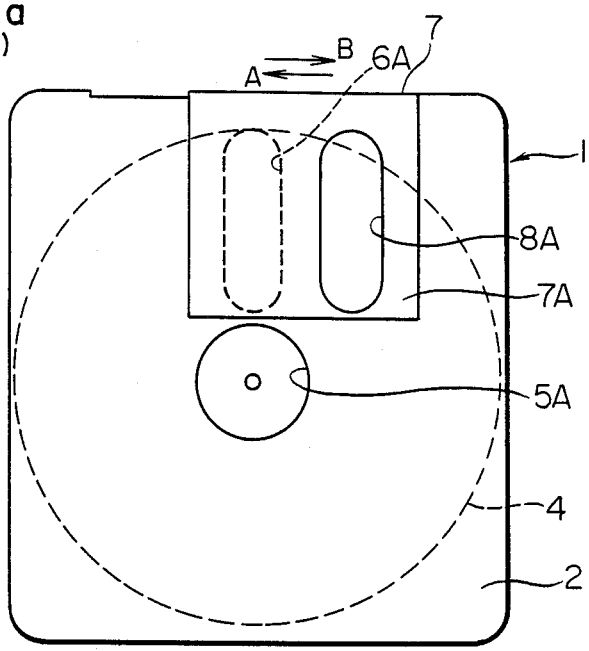
FIGS. 12a and 12b are plan views of a conventional disk cartridge.
Figure 12B:
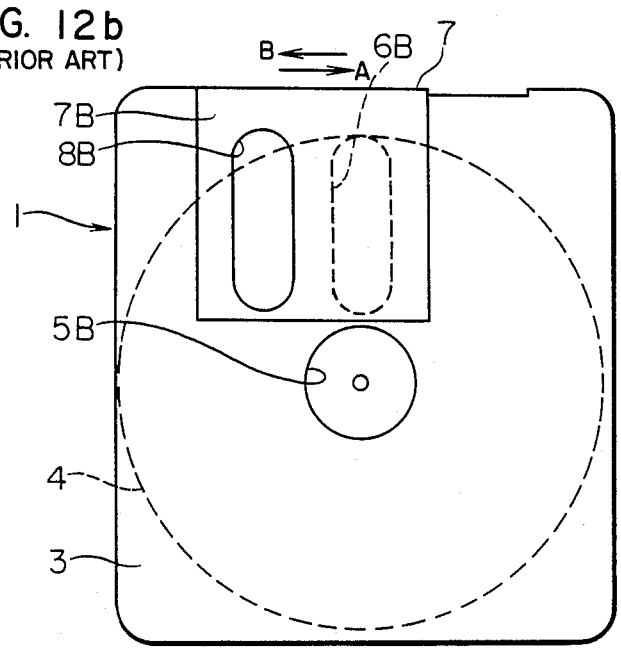
Figure 13A:
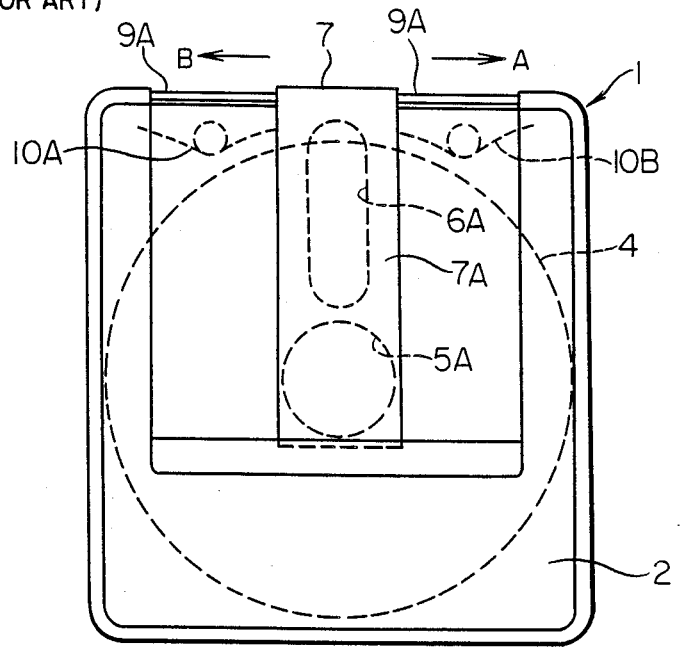
FIGS. 13a and 13b are plan views of another example of a conventional disk cartridge.
Figure 13B:
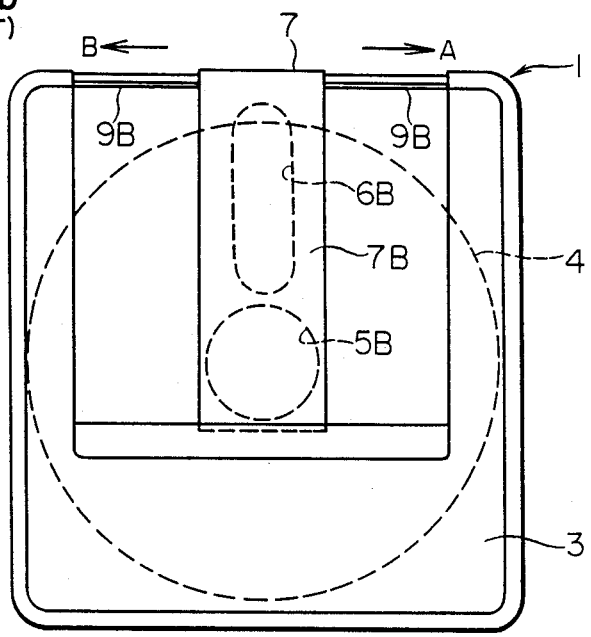

FIG. 11 is an illustration of still another modified example of the shutter member 7. This example differs from that shown in FIG. 6 in that apertures 38A and 38B which have substantially the same size as that of the head entry apertures are formed on opposite sides of one of the cover portions (cover portion 71B in FIG. 11) by forming the frame portions 39A and 39B.

It is possible to reduce the thickness of the front plate portion 33 to a thickness substantially equal to that of the cover portions 71A and 71B by using the type of shutter member shown in FIG. 6 even if the shutter member is formed from a synthetic resin. Therefore, the front plate portion 33 does not tend to warp after the shutter member has been formed. If an arcuate curvature of the front plate portion 33 occurs so that both opposite ends of the front plate portion 33 protrude forward, there is a possibility of the opposite ends of the front plate portion 33 riding over the forward corner portions 13A and 13B when the shutter member moves to these portions, resulting in instability of positioning of the shutter member at the time of shutter opening. This possibility can be eliminated and the reliability of the operation of the shutter member 7 can be improved by preventing the occurrence of any warp in the front plate portion 33.

It is possible to reduce the thickness of the front plate portion 33 while maintaining sufficient areas of the opening member engaging portions 36A and 36B by using the types of shutter members 7 shown in FIGS. 6 to 10. It is thereby possible to set the disk cartridge loading position closer to the carriage mechanism, thereby reducing the size of the recording and reproduction apparatus.

The above-described construction in accordance with the present invention enables the head entry apertures to be open by the movement of the shutter member in only one direction and, hence, using only one shutter opening member, irrespective of which recording surface of the double-sided disk recording medium is used for recording or reproduction.

The front plate portion extends along the direction of the sliding movement of the shutter member and has abutting surfaces which are formed at its opposite ends and which contact the shutter opening member. It is therefore possible to disposed the shutter opening mechanism in a position deviated from that of the carriage mechanism, thereby facilitating the design of the recording and reproducing apparatus.

As shown in FIG. 7, intermediate portions 41 may be formed between the spindle holes 5A and 5B and the shutter slide portions 11A and 11B at the levels of the outer surfaces of the upper and lower casings 2 and 3 while the levels of the outer surfaces of the cover portions 71A and 71B coincide with those of the upper and lower casings 2 and 3, thereby eliminating the possibility of the cover portions 71A and 71B being turned upward by a finger, etc.

What is claimed is:

1. A disk cartridge, comprising: a cartridge casing containing therein a double-sided disk recording medium, a pair of head entry apertures formed on two opposed surfaces of said cartridge casing, and a shutter member having a U-shaped side profile and slidably engaging the opposed surfaces of said cartridge casing for opening and closing said head entry apertures, wherein said shutter member is provided with opposed cover portions having a width slightly larger than the width of said head entry apertures opposite thereto in the direction of sliding movement of said shutter member; and front plate portion projecting from said cover portions on the opposite sides thereof in said sliding directions to form in plan view a T-shaped configuration of said shutter member and movable along a front end surface of said cartridge casing; and abutting surfaces formed at opposite ends of said front plate portion and contactable with a shutter opening member.

2. A disk cartridge according to claim 1, wherein the length of said front plate portion in said sliding direction is about 3 to 9 times as large as the width of said cover portion in said sliding direction.

3. A disk cartridge according to claim 1, wherein a reinforcement portion is formed at a root portion of said cover portion on the side of said front plate portion at which said cover portion is connected to said front plate portion.

4. A disk cartridge according to claim 1, wherein a pair of opening member engaging portions projecting forward from said front plate portion are formed at the opposite ends of said front plate portion.

5. A disk cartridge according to claim 4, wherein said opening member engaging portion has a reinforcement portion extending from the surface opposite to an engaging surface of said opening member engaging portion to said front plate portion.

* * * * *